United States Patent [19]

Lapeyre et al.

[11] 4,393,544

[45] Jul. 19, 1983

[54] KRILL PEELING MACHINE

[75] Inventors: James M. Lapeyre, New Orleans, La.; Noel A. Svendsen, Marblehead; Raymond J. Carroll, Jr., Pinehurst, both of Mass.; Henry H. Long, River Ridge, La.; Richard S. Lindberg, Shrewsbury, Mass.

[73] Assignee: The Laitram Corporation, New Orleans, La.

[21] Appl. No.: 230,709

[22] Filed: Feb. 2, 1981

[51] Int. Cl.³ .............................................. A22C 29/02
[52] U.S. Cl. ....................................................... 17/73
[58] Field of Search ..................... 17/73, 46, 48, 51, 53

[56] References Cited

U.S. PATENT DOCUMENTS

| | | | |
|---|---|---|---|
| 2,429,828 | 10/1947 | Lapeyre et al. | 17/2 |
| 2,755,501 | 7/1956 | Samanie | 17/2 |
| 2,778,055 | 1/1957 | Lapeyre et al. | 17/2 |
| 2,781,544 | 2/1957 | Skrmetta | 17/2 |
| 2,832,092 | 4/1958 | Lapeyre et al. | 17/2 |
| 2,976,564 | 3/1961 | Skrmetta | 17/2 |
| 3,070,833 | 1/1963 | Skrmetta | 17/45 |
| 3,383,734 | 5/1968 | Lapeyre | 17/2 |
| 3,662,432 | 5/1972 | Wenstrom et al. | 17/53 |
| 3,665,555 | 5/1972 | Willis | 17/53 |
| 3,740,795 | 6/1973 | Cox | 17/73 |
| 3,829,933 | 8/1974 | Lambert | 17/53 |
| 3,945,084 | 3/1976 | Willis | 17/73 |

FOREIGN PATENT DOCUMENTS 247915 7/1963 Australia .................................. 17/73

OTHER PUBLICATIONS

The Utilization of Krill, by C. J. Grantham, published in Food and Agriculture Organizations of the United Nations, United Development Programme, Roma 1977.
The Antartic Krill Resource: Prospects for Commercial Exploitation, Tetra Tech., Inc., Pasadena, Ca. prepared for Dept. of State, Washington, D.C. PB–280 791, Feb. 1978.

Primary Examiner—Willie G. Abercrombie
Attorney, Agent, or Firm—Wilkinson, Mawhinney & Theibault

[57] ABSTRACT

The present disclosure is directed to a krill peeling machine having a bank or plurality of banks of pairs of peeling rolls having peeling nips therebetween and with their major axes transverse to the path of flow of a supply of krill to be peeled through the machine. There are means for oscillating the peeling rolls causing the nips to engage and peel the krill to provide a tail meat with shell removed. The bank of peeling rolls are positioned at a declination of from 20° to 30° to the horizontal, each bank having a loading and discharge end. A krill leveling means is situated at the loading end of each peeling bank for distributing the krill substantially evenly across the peeling nips of the transversely disposed rollers to provide a layer of krill in contact with the peeling nips. Each peeling section has water means positioned to supply a water spray so that the water acts as a peeling lubricant between the krill and peeling nips and also as a conveyor to promote progress of the krill down the bank of peeling rolls as a fluid conveyor bed the speed of progress of which can be varied depending on the size and age of the krill. Also located above the transversely disposed peeling rolls are krill longitudinal guide means which are spaced transversely along the major axes of the peeling rolls to maintain a uniform distribution of krill transversely of the axes of the peeling rolls. For shipboard installation these guides may be foraminous to permit passage of conveying water therethrough to avoid waving up of krill all to one side of the machine when the ship rolls and flushing of unpeeled krill down the length of the peeling and/or cleaning section along with peeled meat.

10 Claims, 18 Drawing Figures

Fig.1

EXTERNAL MORPHOLOGY OF A EUPHAUSIID:

1. Rostrum
2. Cervical groove
3. Carapace covering cephalothorax
4-9. Six abdominal segments
10. Dorsal spine
11. Dorsal keel
12. Telson
13. Uropods
14-17. Fifth to second pairs of pleopods
18. First pair of pleopods modified in male to form
19. The petasma
20. Luminescent organ of second abdominal segment
21. Gills
22. Lateral denticle of carapace
23. Exopodite of sixth thoracic limb
24. Endopodites of first and sixth thoracic limbs
25. Flagellae of first and second antennae (antennules and antennae respectively)
26. Position of reflexed leaflets or of lappets on peduncle of antennule
27. Antennal scale
28. Peduncle of antenna
29. Mouthparts
30. Preanal spine of sixth abdominal segment
31. Actual average length when mature = |←————5 CM————→|

| GAUGE(thickness) = | NIP GAP |
|---|---|
| 18 GA .048 | .008 |
| 16 GA .060 | .009 |
| 14 GA .075 | .010 |
| 13 GA .090 | .011 |
| 11 GA .105 | .0125 |

KRILL PEELING MACHINE

TECHNICAL FIELD

Our invention relates to a krill peeling machine whose peeling rolls are transverse to the path of flow of krill over the rolls.

The rolls are arranged in banks with their axes transverse to the length of the bank and all rolls are in pairs geared together to oscillate and where adjacent rolls come together they define a peeling nip the gap opening of which may be fixed or varied. Each bank of rolls has krill leveling and feeding means at its loading end to assure an even distrubtion layer of krill across the peeling nips as well as a regulated water supply upon the peeling rolls to lubricate the krill and convey the krill from the loading end to the discharge end over the peeling nips of the peeling rolls which are transverse or at a right angle to their path of flow of the krill. Longitudinal guide means may be positioned just above the peeling rolls to prevent shifting of all the krill to the sides of the machine on shipboard installations, these may be foraminous to avoid trapping water and generating a wave of krill to one side of the machine.

BACKGROUND AND SUMMARY OF THE INVENTION

This invention is directed to a machine for peeling krill which are defined as euphausiids which are small, shrimp-like organisms. They are distributed around the world in both shallow and deep pelagic waters. There are 85 recognized species of krill.

Most likely the highest value products obtainable from krill will be based on shell-free intact tail meats. The peeling of krill by shrimp-peelers has been undertaken with conventional shrimp peeling machines such as shown in U.S. Pat. Nos. 2,755,501; 2,778,055; 2,781,544; 2,976,564; 3,070,833 and 3,383,734 which employ contra-rotating parallel rollers parallel to the path of travel of raw material through the machine. Results while encouraging have been far from satisfactory with regard to yield and capacity within a given cubical space. The parallel rolls are inclined. The raw material (krill) is fed automatically to the peeler where the rapidly alternating contra-rotating inclined parallel rollers pull off the heads, carapace, legs and feelers. The action is assisted by copious quantities of flowing water.

One of the main points of distinction of the machine of the present invention over the machines of the above identified patents is the fact that the peeling rolls of the present machine have their major axes transverse to the path of flow of krill through the machine. Positioning the peeling rolls with their axes transverse to the path of flow of the raw material over the peeling rolls broadly is shown in U.S. Pat. Nos. 2,429,828; 3,740,795 and 2,832,092 however these patents do not teach the krill feeding and water conveying techniques of the present machine which lend themselves to shipboard or land based operation.

The extremely poor keeping quality of krill seems to indicate that processing take place within three or four hours after catching.

The catching and processing of krill is best shown and described in THE UTILIZATION OF KRILL, by C. J. Grantham, published in FOOD AND AGRICULTURE ORGANIZATIONS OF THE UNITED NATIONS, UNITED DEVELOPMENT PROGRAMME, ROME 1977 and THE ANTARTIC KRILL RESOURCE: PROSPECTS FOR COMMERCIAL EXPLOITATION, TETRA TECH INC., Pasadena, Ca., prepared for Dept. of State, Washington, D.C. PB-280 791 Feb. 1978.

One object of the invention is to provide a krill peeling machine of high capacity which occupies a small amount of cubical space for use aboard seagoing vessels.

Another object of the invention is to provide a krill peeling machine which uses gravity rather than conveyors to carry the krill from the peeling stage to the cleaning stage in a single machine.

Another object of the invention is to provide a krill peeling machine which produces the maximum amount of edible meat from a given quantity of shell-on krill.

Another object of our invention is to provide a krill longitudinal guide means spaced transversely along the major axes of the transversely disposed inclined peeling rolls to maintain a uniform layer of krill over the peeling nips independent of the rate of water employed as a peeling lubricant and conveyor. In the instance of a shipboard or vessel installation the longitudinal guide means are foraminous to permit the water to flow transversely of the path of peeling flow to avoid waving of the krill to the side of the machine in the direction of roll of the vessel.

A still further object of our invention is the provision of a krill leveling device for use with a bank of transversely positioned oscillating peeling rolls which leveling device may be vertically raised and lowered and the speed of which can increase or decrease the quantity of krill supplied to the bank of peeling rolls necessary to provide a uniform mat of krill to be subjected to the peeling nips of the bank of peeling rolls.

Our invention also provides a plural bank or tier arrangement with loading chutes that subject the krill to the peeling action of only one bank of peeling rolls prior to being subjected to a final bank of cleaning rolls. The angle of incline of each bank of peeling rolls is from 20° to 30° below the horizontal. Preferably the inclination should be of the order of 26°.

BEST MODE FOR CARRYING OUT THE INVENTION

Figure 1:
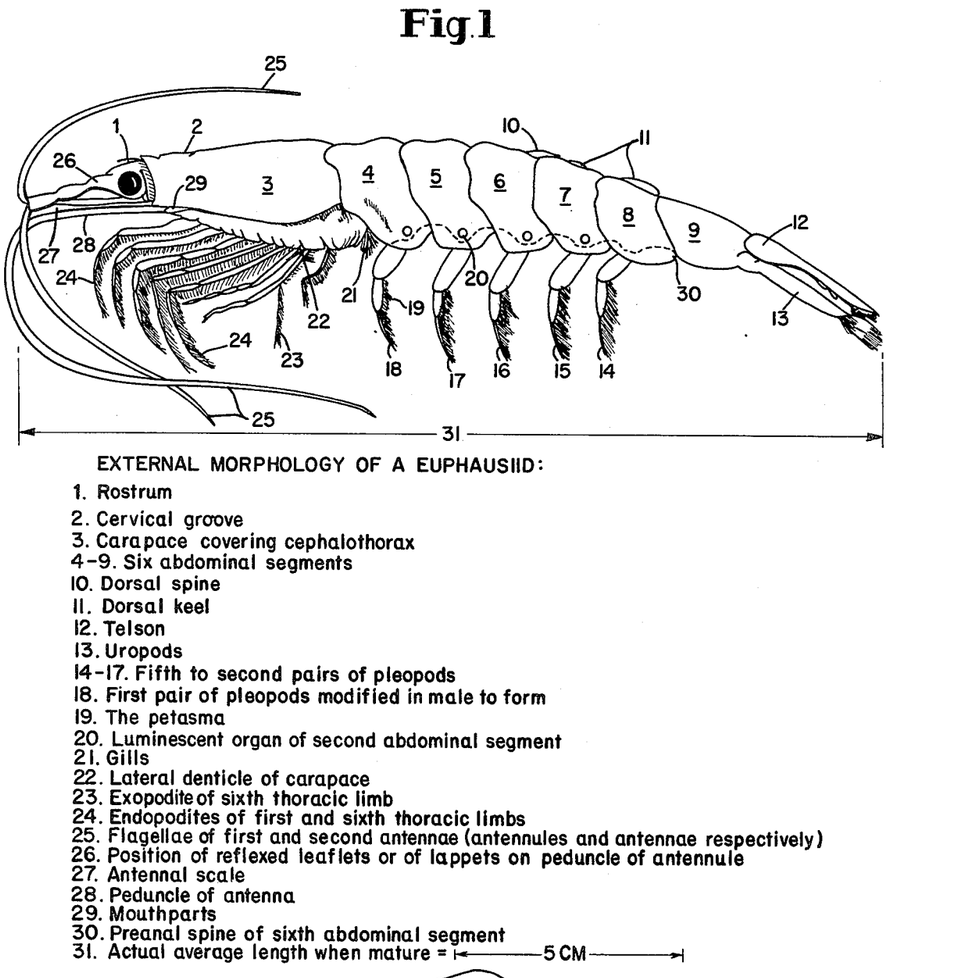
FIG. 1 is a side elevational view of a krill or euphausiid with anatomical chart.
Figure 2:
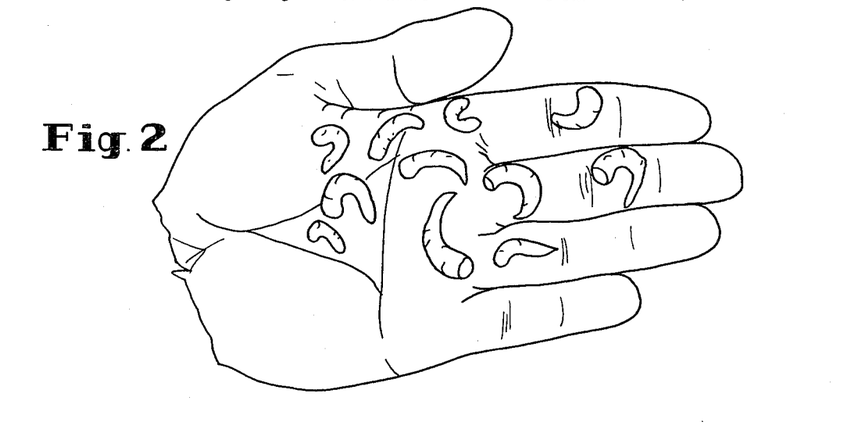
FIG. 2 is an illustration of size comparison of a plurality of krill relative to the human hand.

Referring to FIGS. 1 and 2, the krill is shown magnified to emphasize its external morphology for comparison with a shrimp which is many times greater in size and in physical shape. FIG. 2 shows a comparison of the krill with the size of the human hand, which also emphasizes the very small size krill.

The apparatus of the present invention is especially designed to bulk peel large quantities of krill.

Figure 3:
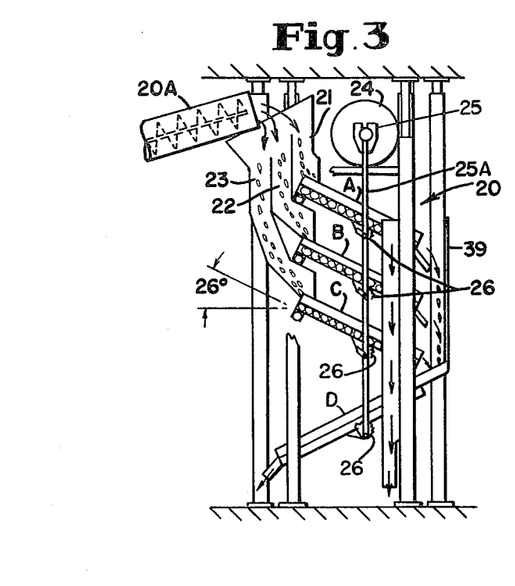
FIG. 3 is a side elevational schematic of the machine of the present invention in a peeling cycle operation.
Figure 4:
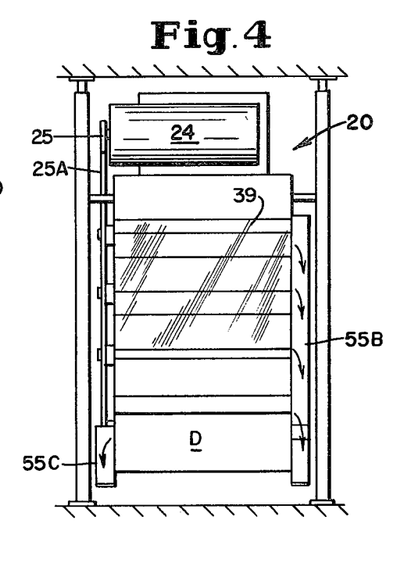
FIG. 4 is an end elevational schematic of FIG. 3.
Figure 5:
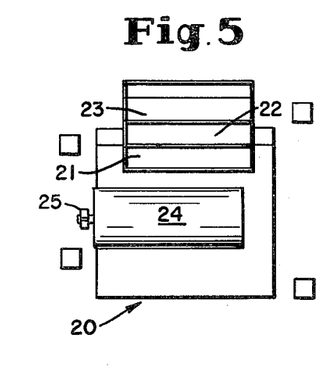
FIG. 5 is a top plan schematic of FIG. 3.
Figure 7:
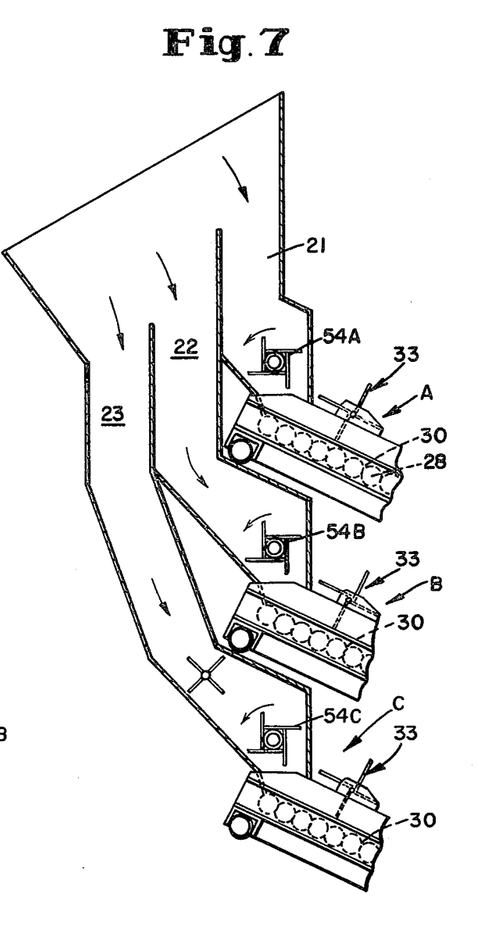
FIG. 7 is a vertical sectional view through the krill loading chutes for each krill peeling section.

Referring now to FIGS. 3 through 5 inclusive, the machine 20 comprises a stacked array of peeling sections A, B, C declined from the horizontal at an angle of from 20° to 30°, preferably of the order of 26°, shown in FIG. 3, below the three peeling sections A, B, C is a cleaner section D. The krill are fed by a conveyor 20A into loading chutes 21, 22, 23 which supply the loading end of each peeling section, FIG. 7 shows the hopper chutes at the loading end of each section.

Figure 8:
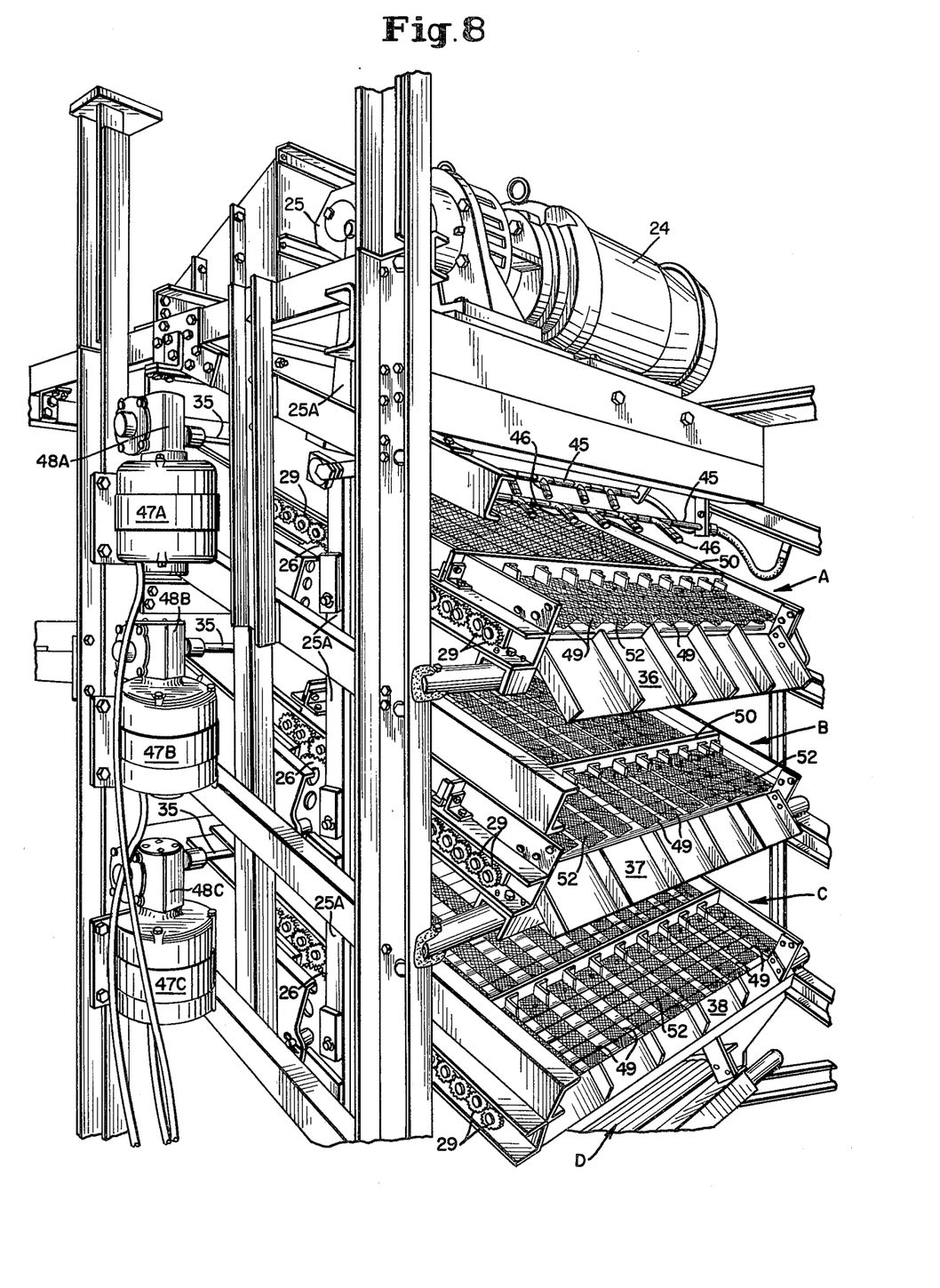
FIG. 8 is a fragmentary perspective view of the machine of the present invention with parts broken away and parts removed.
Figure 10:
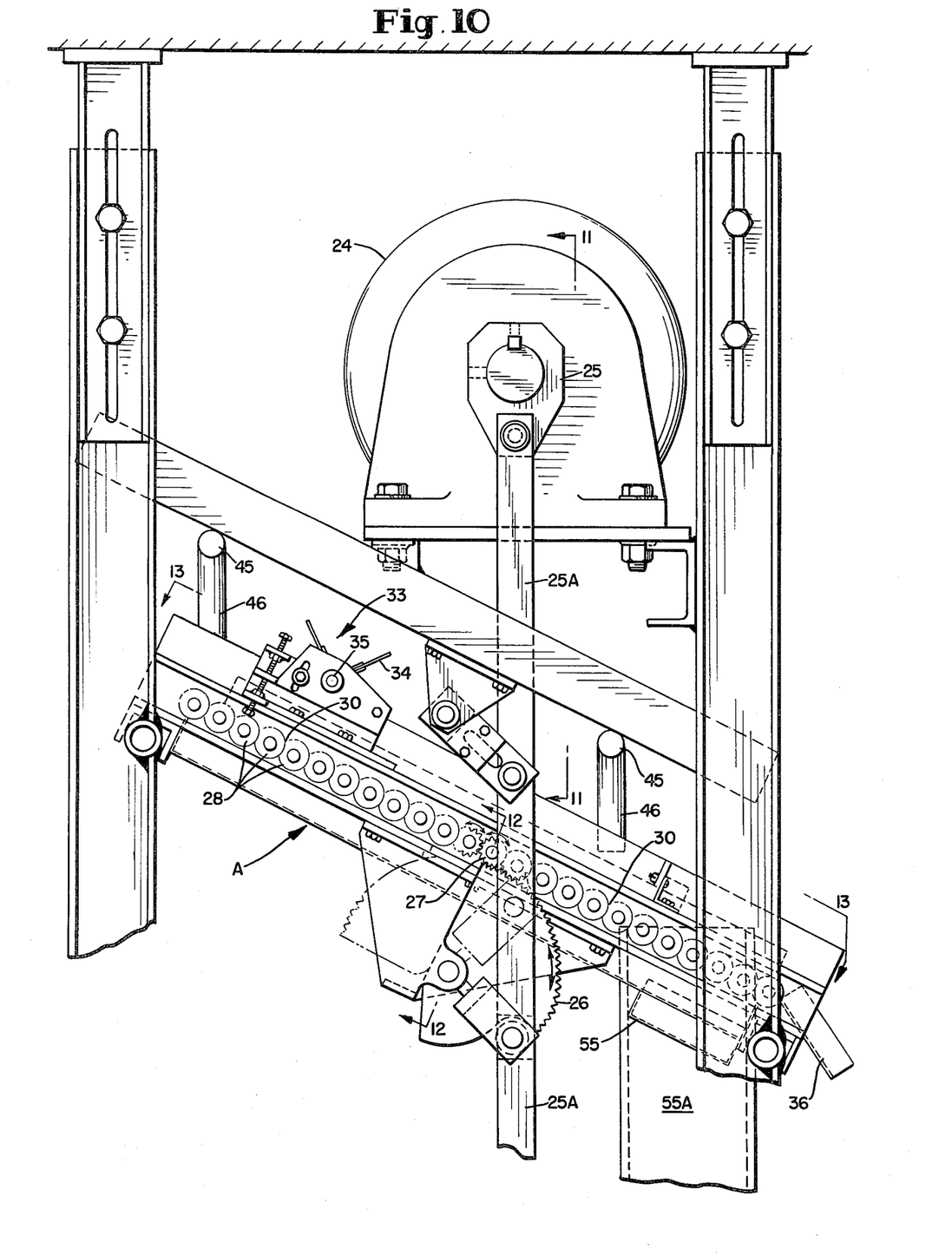
FIG. 10 is a fragmentary end elevational view of the machine of FIGS. 8 and 9 with particular detail of the A peeling section and drive mechanism.
Figures 11, 12:
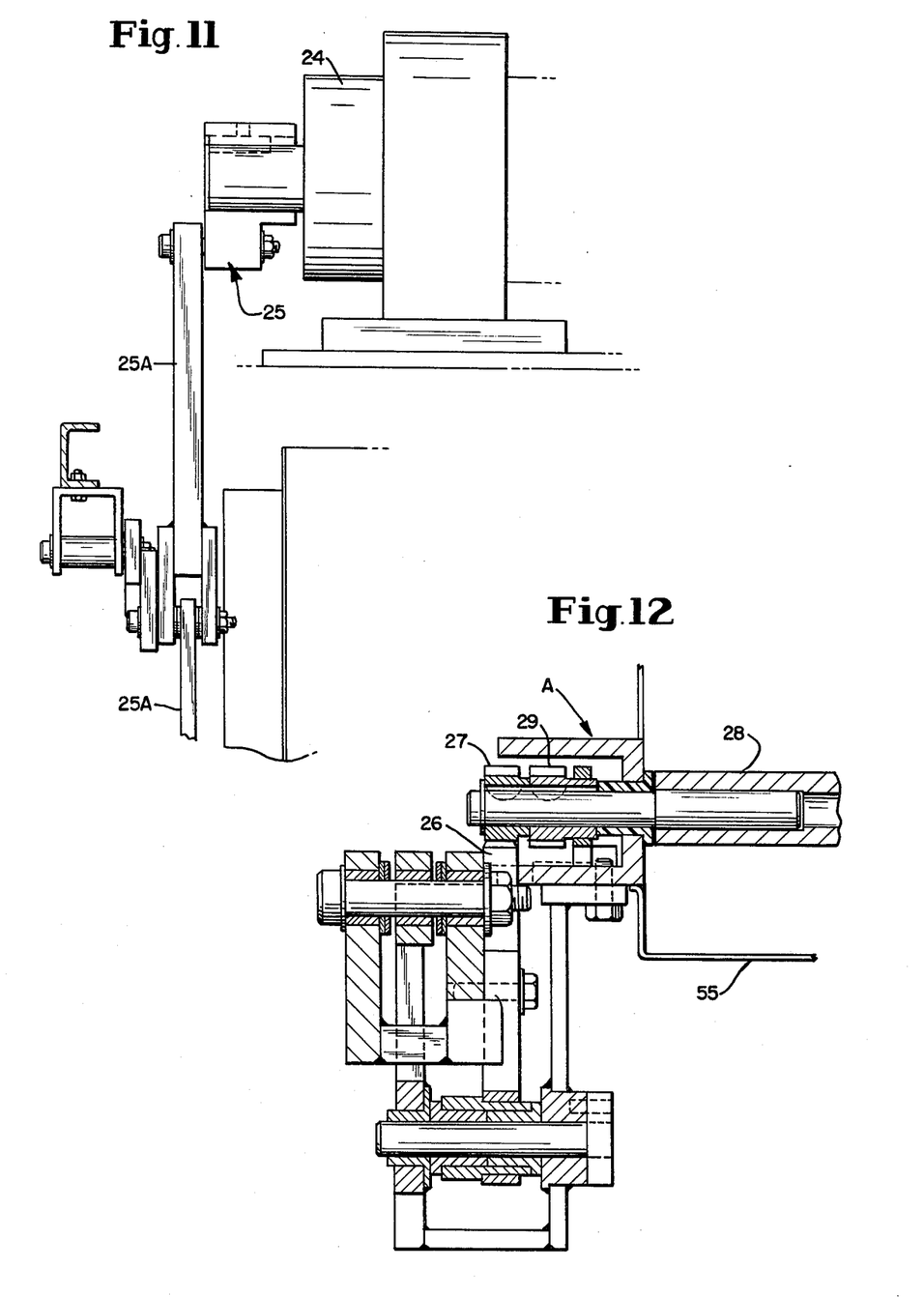
FIG. 11 is an end elevational view of the drive mechanism taken on the lines 11—11 in FIG. 10.
FIG. 12 is a vertical section taken through the segment gear drive for the peeling rolls taken on the lines 12—12 in FIG. 10.
Figures 13, 14:
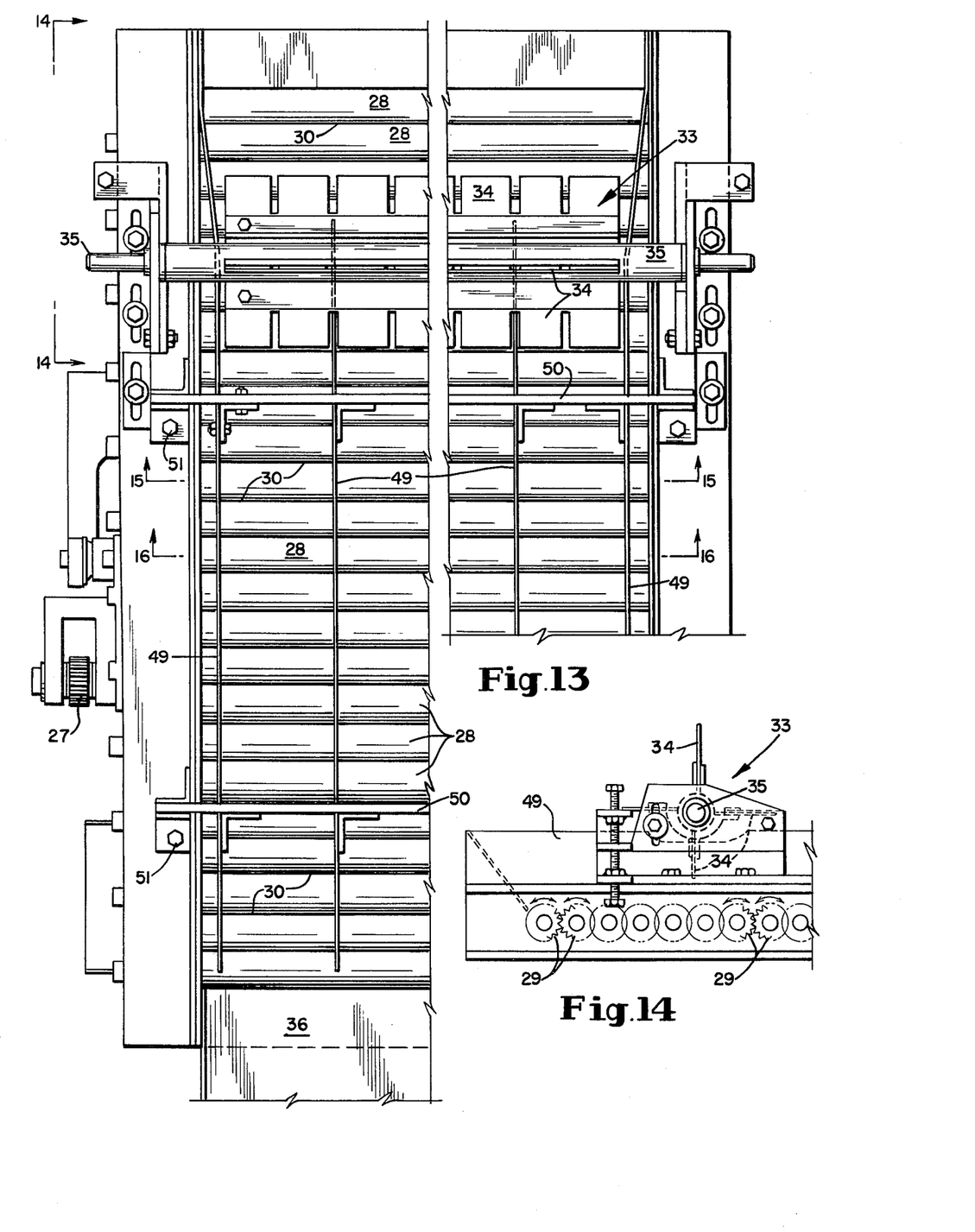
FIG. 13 is a top plan view with parts broken away to show the peeling section and the krill leveling paddle.
FIG. 14 is a side elevational view of the loading end of a peeling section taken on the line 14—14 in FIG. 13.

Referring to FIGS. 10 and 12, an electric motor 24 drives a network of crank shafts 25A which drive segment gears 26 in mesh with a pinion 27 which is keyed to and oscillates a peeling roll 28 which has a keyed gear 29 keyed with pinion 27. Each pair of peeling rolls 28 have intermeshing gears 29 which are geared to be driven in oscillation as best seen in FIGS. 8, 10 and 14. The peeling rolls 28 are smooth, arranged in pairs having a peeling nip 30 therebetween. The peeling rolls 28 are arranged with their major axes transverse to the path of flow of krill through the machine.

Figure 15:
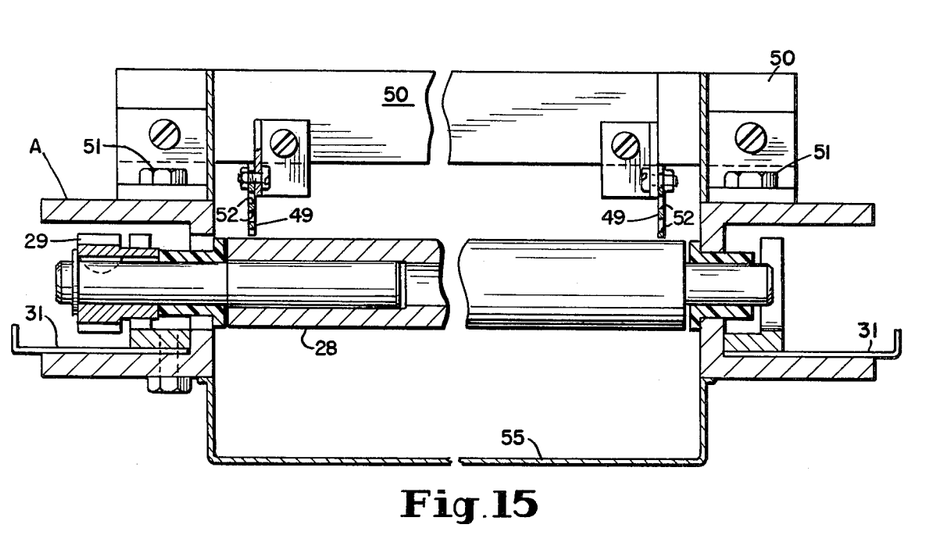
FIG. 15 is a tranverse section taken through a peeling section with parts broken away to show means for varying the gap of the peeling rolls and the krill longitudinal guide means, taken on the line 15—15 in FIG. 13.
Figure 16:
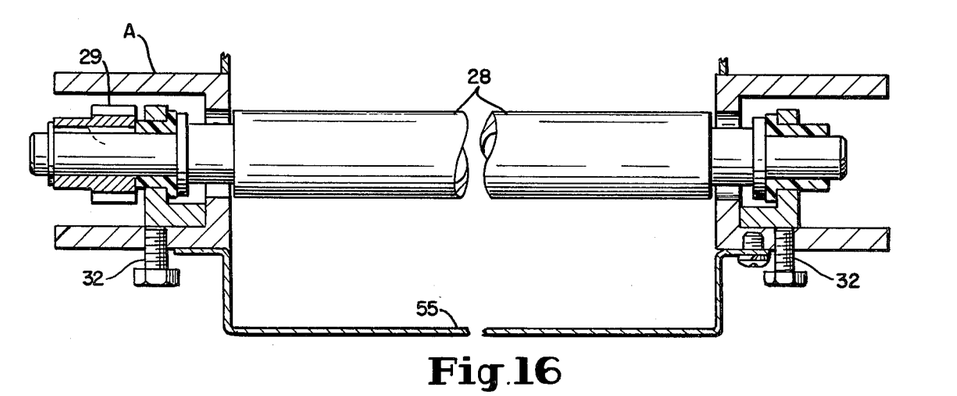
FIG. 16 is a view similar to FIG. 15 with a modified form of nip gap adjustment, taken on the line 16—16 in FIG. 13.
Figure 17:
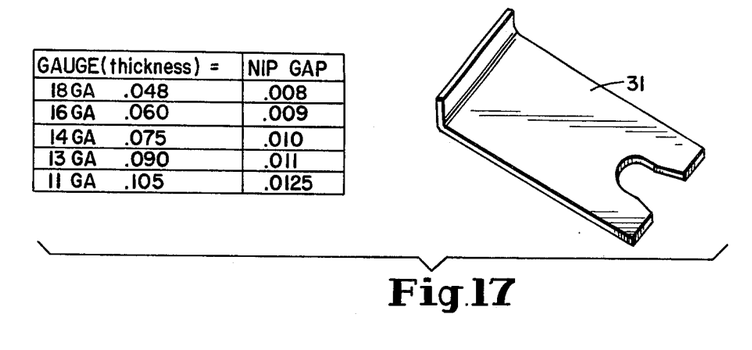
FIG. 17 is a perspective view of a peeling nip gap adjustment shim for varying the peeling nip as indicated in the table.

As shown in FIGS. 14 thru 18, the gap or peeling nips 30 between adjacent peeling rolls 28 may be varied by use of shim plates 31 of varying thicknesses shown in FIG. 17 in conjunction with adjusting bolt 32. Only one roll of each pair of peeling rolls 28 is adjusted to vary the gap of the peeling nip 30.

Referring to FIGS. 10 and 13, the upper or loading end of each peeling section is provided with a krill leveling paddle 33 having a plurality of blades 34 secured to a shaft 35 the height of which may be varied to determine the thickness of the krill layer over the transversely disposed peeling rolls 28. The speed of rotation of the paddle shaft 35 may be varied to either increase or decrease the quantity of krill supplied to the nips 30 of the peeling rolls 28.

As shown in FIGS. 8, 9 and 10 and 18, the banks of peeling rolls A, B and C are arranged with their loading end above the level of the discharge end which permits of gravity flow of both krill and the lubricating and conveying water from the loading to the discharge end. The krill are subjected to only one peeling and one cleaning section at a 3 to 1 ratio of peelers to cleaners regardless of how many peeling sections are vertically stacked.

Figure 18:
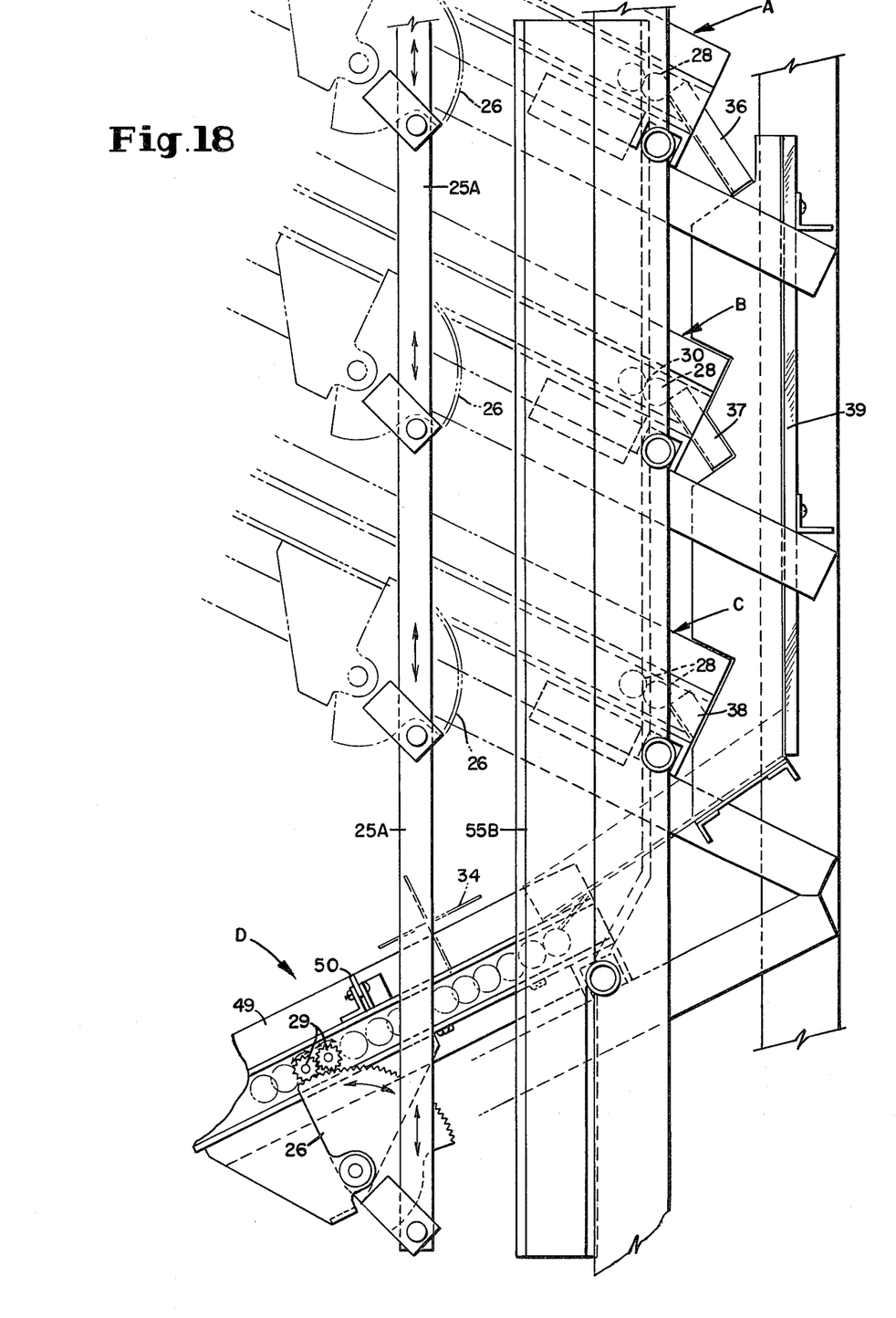
FIG. 18 is a schematic of the peeling section drive for driving the segment gears of each peeling section and the discharge chute from each peeling section to the cleaner section.

As shown in FIG. 18, krill peeled in Sections A, B and C are discharged directly into the loading end of the cleaner section D by chutes 36, 37, 38. A common chute wall 39 is a clear plastic plate which permits viewing of the peeled krill meats being discharged from each peeling section prior to their entry into the cleaner section D.

Figure 9:
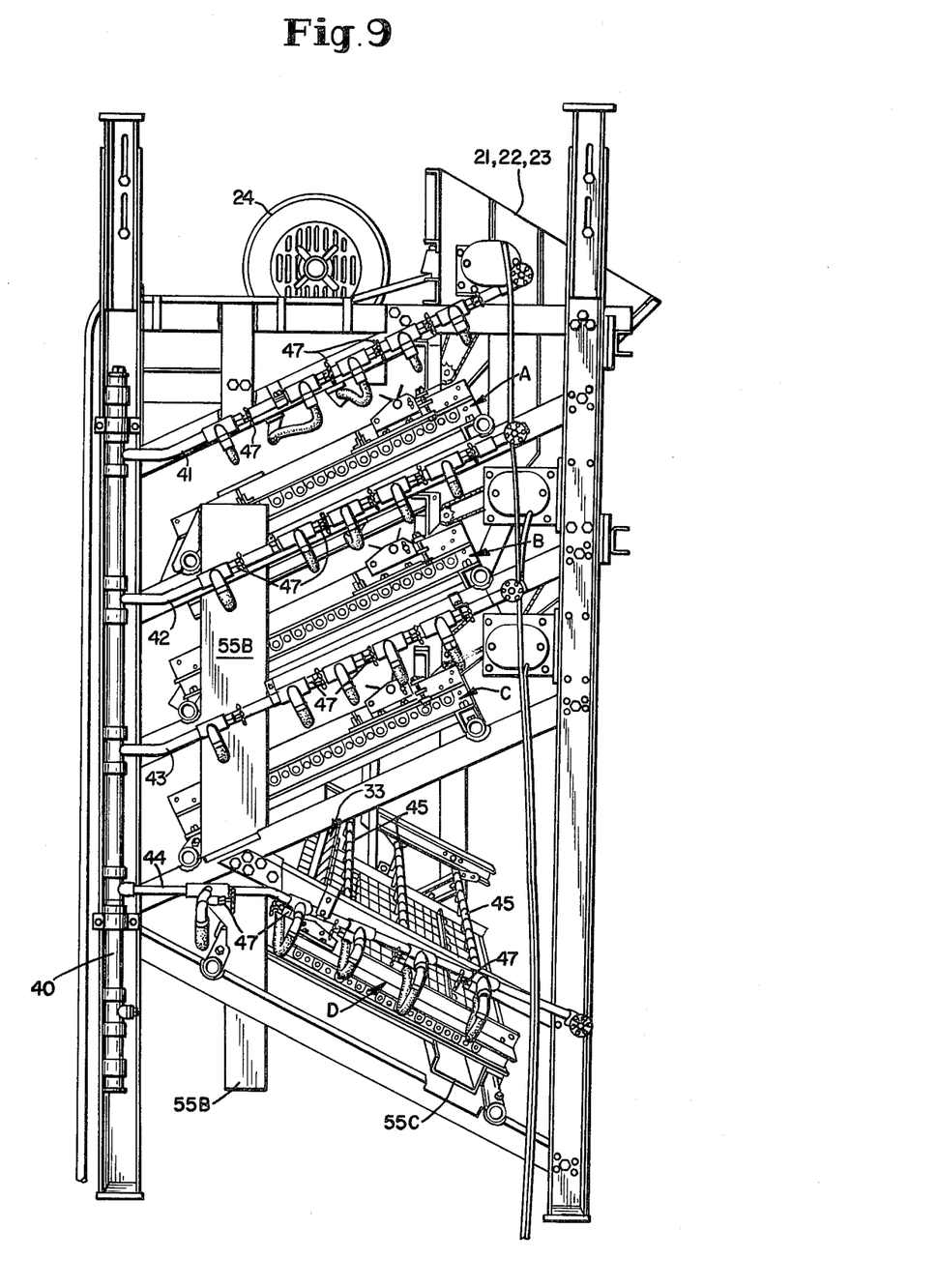
FIG. 9 is a side elevational view of the machine of the present invention taken from the water supply side and showing the water system.

As shown in FIG. 9, the water supply to each section A, B, C and D is supplied by a header pipe 40 with lines 41, 42, 43 and 44 to each section. Spray or drip feed lines 45 are arranged transversely of the peeling sections substantially parallel to and above the peeling rolls each line having a plurality of nozzles 46 and each line having a valve 47 to regulate water flow to the nozzle 46 and down upon the peeling nips 30 to lubricate and facilitate the peeling action as well as to act as a conveyor for the krill being peeled.

As shown in FIGS. 10 and 11, the drive mechanism for the segment gears which drive the peeling rolls in each peeling section is shown, see also FIG. 3. The motor 24 drives crank 25 which is also connected to drive arm 25A which is connected to drive the segment gear 26 in each of the sections A, B, C and D.

Referring now to FIG. 12, the top peeling section A has its peeling rolls 28 journaled in a frame with a hub and drive shaft to which is secured a pinion 29 which mates with a companion pinion 29 to drive its adjacent peeling roll 28 to form the peeling nip 30. Outwardly of pinion 29 is another pinion 27 keyed to drive the peeling roll and be engaged and driven by the segment gear 26 so as to oscillate each pair of peeling rolls in its respective peeling section.

As shown in FIGS. 8 and 9, the krill leveling paddle 33 of each section A, B, C and D is controlled by an electric motor 47A, 47B, 47C and connected gear reducers 48A, 48B, 48C which drive the paddle shafts 35 at whatever speed the progress of peeling action indicates is optimum depending on the size and age of krill out of the water. This speed adjustment is under the eye and judgement of the machine operator so as not to overload the machine or over peel the krill.

Since the major axes of the peeling rolls 28 are transverse to the path of travel of krill through the machine and the peeling rolls 28 are of substantial length it is important to maintain a uniform layer of krill on each peeling section along the peeling nips 30. To assure such distribution of raw material longitudinal guide means 49 are spaced transversely along the major axes of the peeling rolls 28 as shown in FIGS. 8, 13 and 15, they are secured to suspension bars 50 which are bolted at 51 to each peeling section frame A, B, C and D. When the machine is for installation on a seagoing vessel which will be subjected to roll along the major axes of the peeling rolls 28 the water between the longitudinal guide means 49 can have a waving effect which will shift all of the krill to the side of the machine in the direction of roll and buoy up the krill out of contact with the peeling nips 30. To overcome this problem the longitudinal guide means 49 are foraminous at 52 to permit free passage of water transversely of the machine with a minimum disturbance between the krill and the peeling nip 30.

The powered peeling rolls 28 are specular having an outside diameter of 0.75 inches to 2" and are preferably of stainless steel.

Figure 6:
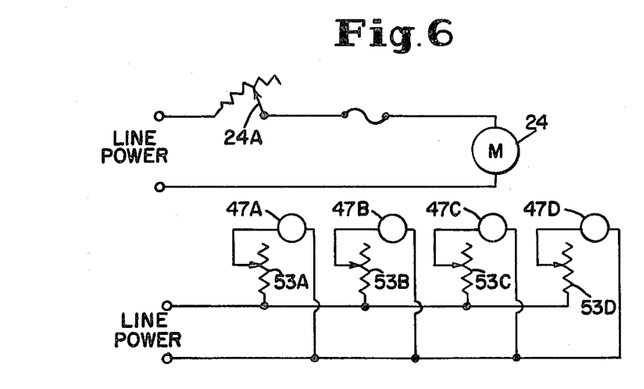
FIG. 6 is an electrical schematic of the peeling sections drive motor and the drive motor schematics for the variable speed leveling paddle drives for the peeling and cleaning sections of the machine.

As shown in FIG. 6, the motor 24 is a variable speed motor having a variable speed control device 24A in series with the line supply voltage and current. When it is desired to increase peeling action the machine operator actuates the speed control device 24A to either speed up or slow down the motor 24 and the drive crank connections to the peeling section A, B, C and D.

To regulate the krill feed to the machine, referring to FIGS. 6 and 7, each peeling section A, B and C has a paddle leveling means 33 the height of which can be varied as shown in FIG. 14, and the paddle shaft 35 rotated by a gear box take off coming off each motor 47A, 47B, 47C and 47D. The paddle shaft drive motors are of the variable speed type each having a variable speed control device 53A, 53B, 53C and 53D and each is independent of the other and variable subject to the watchful eye of the machine operator to cope with on site conditions. As best seen in FIG. 7, located at or near the discharge mouth of each chute are motor driven feed paddles 54A, 54B and 54C to feed krill onto the peeling sections A, B, C. Each of the banks of peeling rolls 28, namely banks A, B, C and D are substantially identical as to peeling rolls 28, peeling nips 30 and water sprays acting as lubricant and conveyor. Each peeling section is driven by a segment gear which drives a peeling roller which is in mesh with an adjacent peeling roll so that each adjacent peeling roll oscillates relative to the other under the control of segment gear 26 controlled by motor 25 and crank links 25.

Each peeling section A, B, C and cleaning section D has a bottom pan 55, FIGS. 15, 16, for water and trash, krill shells removed during peeling, and each discharges to discharge duct 55B for disposal either on the floor of the plant, deck of the vessel or piped out of the plant or overboard. The bottom cleaning section D in FIG. 9 has a water discharge trash trough 55C which discharges on the deck.

While motors 24, 47A, 47B, 47C and 47D have been shown to be electric motors it will be appreciated by those skilled in the art that fluid motors such as hydraulic or pneumatic may be employed particularly in marine installations to avoid electrical accidents. The motors may be connected to a ship's service hydraulic or pneumatic line.

What we claim:

1. A krill peeling machine comprising:
   a bank of pairs of peeling rolls having peeling nips therebetween with their major axes transverse to the path of flow of a supply of krill to be peeled,
   means for oscillating said peeling rolls causing said nips to engage and peel krill,
   said banks of peeling rolls being at a declination from the horizontal of from 20° to 30° and having a loading and discharge end,
   leveling means at the loading end of said peeling bank for distributing the krill substantially evenly across the peeling nips of the rollers to provide a layer of krill in contact with the peeling nips,
   krill longitudinal guide means spaced transversely along the major axes of the peeling rolls to maintain a uniform distribution of krill transversely of the axes of the peeling rolls,
   and water means positioned to supply water means so that the water acts as a peeling lubricant between the krill and peeling nips and also as a conveyor to promote progress of the krill down the bank of peeling rolls as a fluid conveyor bed the speed of progress of which can be varied depending on the size and age of the krill.

2. A krill peeling machine as claimed in claim 1 wherein said guide means are foraminous to permit passage of water therethrough without substantially varying the layer of krill transversely of the bank of peeler rolls.

3. A krill peeling machine comprising:
   a plurality of vertically tiered krill peeling sections,
   each peeling section comprising a bank of pairs of peeling rolls having peeling nips therebetween with their major axes transverse to the path of flow of a supply of krill to be peeled,
   means for oscillating said peeling rolls causing said nips to engage and peel krill,
   said bank of peeling rolls being at a declination of from 20° to 30° to the horizontal having a loading and discharge end,
   krill loading means to introduce krill into the loading end of each bank of peeling rolls simultaneously having a flared intake mouth and individual chutes of varying length to reach the loading end of each bank of peeling rolls in the vertical stack,
   guide means at the end of the machine opposite said krill loading means to direct krill being discharged from each section above the bottom section into the loading end of the bottom peeler cleaner section,
   leveling means at the loading end of said peeling bank for distributing the krill substantially evenly across the peeling nips of the rollers to provide a layer of krill in contact with the peeling nips, and water means positioned to supply water so that the water acts as a peeling lubricant between the krill and peeling nips and also as a conveyor to promote progress of the krill down the bank of peeling rolls as a fluid conveyor bed and speed of progress of which can be varied depending on the size and age of the krill, and
   krill longitudinal guide means spaced transversely along the major axes of the peeling rolls to maintain a uniform distribution of krill transversely of the axes of the peeling rolls,
   said guide means being foraminous to permit passage of water therethrough without substantially varying the layer of krill transversely of the bank of peeler rolls.

4. A krill peeling machine comprising:
   a plurality of vertically tiered krill peeling sections,
   each peeling section comprising a bank of pairs of peeling rolls having peeling nips therebetween with their major axes transverse to the path of flow of a supply of krill to be peeled,
   means for oscillating said peeling rolls causing said nips to engage and peel krill,
   said bank of peeling rolls being at a declination of from 20° to 30° to the horizontal having a loading and discharge end, a rotary krill leveling paddle in each peeling section having a plurality of blades secured to a shaft the height of which may be varied to determine the thickness of the krill layer and the speed of rotation of the shaft being variable, said shaft being substantially parallel to the axes of the peeling rolls for distributing the krill substantially evenly across the peeling nips of the rollers to provide a layer of krill in contact with the peeling nips, and water means positioned to supply water so that the water acts as a peeling lubricant between the krill and peeling nips and also as a conveyor to promote progress of the krill down the bank of peeling rolls as a fluid conveyor.

5. A krill peeling machine comprising:

a bank of pairs of peeling rolls having peeling nips therebetween with their major axes transverse to the path of flow of a supply of krill to be peeled, means for oscillating said peeling rolls causing said nips to engage and peel krill, said bank of peeling rolls being at a declination from the horizontal of from 20° to 30° and having a loading and discharge end, rotary paddle leveling means at the loading end of said peeling bank for distributing the krill substantially evenly across the peeling nips of the rollers to provide a layer of krill in contact with the peeling nips, krill longitudinal guide means spaced transversely along the major axes of the peeling rolls to maintain a uniform distribution of krill transversely of the axes of the peeling rolls, and water means positioned above said bank to supply water so that the water acts as a peeling lubricant between the krill and peeling nips and also as a conveyor to promote progress of the krill down the bank of peeling rolls as a fluid conveyor bed the speed of progress of which can be varied depending on the size and age of the krill, and the opening of the peeling nips being variable to accommodate varying species of krill and krill morphology degradation from time of catch to time of peeling.

6. A krill peeling machine comprising:

a bank of pairs of peeling rolls having peeling nips therebetween with their major axes transverse to the path of flow of a supply of krill to be peeled, means for oscillating said peeling rolls causing said nips to engage and peel krill, said peeling rolls being of an outside diameter of one inch plus 1.0" or minus 0.25", said bank of peeling rolls being at a declination from the horizontal of from 20° to 30° and having a loading and discharge end, rotary paddle leveling means at the loading end of said peeling bank for distributing the krill substantially evenly across the peeling nips of the rollers to provide a layer of krill in contact with the peeling nips, krill longitudinal guide means spaced transversely along the major axes of the peeling rolls to maintain a uniform distribution of krill transversely of the axes of the peeling rolls, and water means positioned above said bank to supply water so that the water acts as a peeling lubricant between the krill and peeling nips and also as a conveyor to promote progress of the krill down the bank of peeling rolls as a fluid conveyor bed the speed of progress of which can be varied depending on the size and age of the krill.

7. A krill peeling machine as claimed in claim 4 wherein the discharge end of all peeling sections above the bottom section are at the same end of the machine and discharge into the loading end of the bottom section which acts as a peeler cleaner section.

8. A krill peeling machine as claimed in claim 4 further comprising krill loading means to introduce krill into the loading end of each bank of peeling rolls simultaneously having a flared intake mouth and individual chutes of varying length to reach the loading end of each bank of peeling rolls in the vertical stack.

9. A krill machine as claimed in claim 4 further comprising guide means at the end of the machine opposite said krill loading means to direct krill being discharged from each section above the bottom section into the loading end of the bottom peeler cleaner section.

10. A machine as claimed in claim 4 wherein the opening of the peeling nip is shim variable to accommodate varying species of krill and krill morphology degradation from time of catch to time of peeling.

* * * * *